US011051534B2

(12) United States Patent
Garwood

(10) Patent No.: US 11,051,534 B2
(45) Date of Patent: Jul. 6, 2021

(54) SEPARATION OF FAT AND LEAN USING A DECANTER CENTRIFUGE

(71) Applicant: Julie Garwood, Mercer Island, WA (US)

(72) Inventor: Anthony J. M. Garwood, Mercer Island, WA (US)

(*) Notice: Subject to any disclaimer, the term of this patent is extended or adjusted under 35 U.S.C. 154(b) by 72 days.

(21) Appl. No.: 16/066,958

(22) PCT Filed: Dec. 29, 2016

(86) PCT No.: PCT/US2016/069270
§ 371 (c)(1),
(2) Date: Jun. 28, 2018

(87) PCT Pub. No.: WO2017/117419
PCT Pub. Date: Jul. 6, 2017

(65) Prior Publication Data
US 2019/0008190 A1    Jan. 10, 2019

Related U.S. Application Data

(60) Provisional application No. 62/272,411, filed on Dec. 29, 2015.

(51) Int. Cl.
A23L 5/20        (2016.01)
A23B 4/09       (2006.01)
A23B 4/20       (2006.01)
A23B 4/24       (2006.01)
B01D 21/26      (2006.01)
(Continued)

(52) U.S. Cl.
CPC ............... *A23L 5/23* (2016.08); *A22C 17/00* (2013.01); *A22C 17/08* (2013.01); *A23B 4/09* (2013.01); *A23B 4/20* (2013.01); *A23B 4/24* (2013.01); *A23L 13/60* (2016.08); *B01D 21/262* (2013.01); *C11B 1/10* (2013.01); *C11B 1/12* (2013.01); *C11B 15/00* (2013.01); *A23V 2002/00* (2013.01)

(58) Field of Classification Search
CPC . A23L 5/23; A23L 13/60; A22C 17/00; A22C 17/08; B01D 21/262; C11B 1/10; C11B 1/12; C11B 15/00; A23V 2002/00; A23B 4/09; A23B 4/20; A23B 4/24
See application file for complete search history.

(56) References Cited

U.S. PATENT DOCUMENTS 3,780,191 A    12/1973  Langer
7,666,456 B2*  2/2010   Garwood ........... B01D 21/2494
                                              426/480
(Continued)

FOREIGN PATENT DOCUMENTS

GB    2504453    *  2/2014

OTHER PUBLICATIONS

International Search Report and the Written Opinion dated Mar. 16, 2017, issued in corresponding International Application No. PCT/US2016/069270, filed Dec. 29, 2016, 14 pages.
(Continued)

Primary Examiner — Anthony J Weier
(74) Attorney, Agent, or Firm — Christensen O'Connor Johnson Kindness PLLC

(57) ABSTRACT

Methods for separating lean and fat from beef or other meats and the separation apparatus are shown. The methods use microbiocidal fluids to reduce or eliminate possible sources of contamination.

11 Claims, 6 Drawing Sheets

(51) Int. Cl.
*A23L 13/60* (2016.01)
*A22C 17/00* (2006.01)
*A22C 17/08* (2006.01)
*C11B 15/00* (2006.01)
*C11B 1/12* (2006.01)
*C11B 1/10* (2006.01)

(56) References Cited

U.S. PATENT DOCUMENTS

| | | | |
|---|---|---|---|
| 8,012,521 B2 | 9/2011 | Garwood | |
| 8,137,722 B2* | 3/2012 | Garwood | A23L 13/00 426/417 |
| 8,178,144 B2* | 5/2012 | Garwood | A23L 3/3445 426/315 |
| 8,568,813 B2* | 10/2013 | Garwood | B01D 21/2444 426/480 |
| 8,911,809 B2* | 12/2014 | Garwood | B01D 21/262 426/332 |
| 9,462,824 B2* | 10/2016 | Garwood | A23L 13/00 |
| 9,497,985 B2* | 11/2016 | Garwood | A23L 5/20 |
| 9,949,494 B2* | 4/2018 | Garwood | A23L 13/00 |
| 2009/0214730 A1 | 8/2009 | Garwood | |
| 2009/0214733 A1 | 8/2009 | Garwood | |
| 2010/0112168 A1* | 5/2010 | Garwood | C11C 3/003 426/480 |
| 2011/0008505 A1 | 1/2011 | Garwood | |
| 2012/0141645 A1 | 6/2012 | Tomcak et al. | |
| 2012/0225171 A1 | 9/2012 | Garwood | |
| 2012/0231131 A1* | 9/2012 | Garwood | A23L 13/00 426/332 |
| 2013/0115349 A1* | 5/2013 | Garwood | A23B 4/06 426/417 |
| 2013/0177685 A1* | 7/2013 | Garwood | A23B 4/09 426/417 |
| 2013/0183422 A1 | 7/2013 | Ludvigsen | |
| 2013/0323374 A1* | 12/2013 | Garwood | A23L 13/60 426/248 |
| 2015/0305388 A1* | 10/2015 | Garwood | A23L 13/60 426/248 |
| 2017/0020175 A1* | 1/2017 | Garwood | A23L 13/60 |
| 2018/0235245 A1* | 8/2018 | Garwood | A22C 17/0026 |
| 2020/0029583 A1* | 1/2020 | Garwood | A22C 17/00 |

OTHER PUBLICATIONS

International Preliminary Examination Report dated Jul. 12, 2018, issued in corresponding International Application No. PCT/US2016/069270, filed Dec. 29, 2016, 13 pages.

* cited by examiner

SEPARATION OF FAT AND LEAN USING A DECANTER CENTRIFUGE

CROSS-REFERENCES TO RELATED APPLICATIONS

This application claims the benefit of U.S. Provisional Application No. 62/272,411, filed Dec. 29, 2015, the disclosure of which is fully incorporated herein expressly by reference.

BACKGROUND

During the process of boning a carcass, and particularly a beef carcass such as a steer or cow, the tallow and fat often referred to as "trim" is removed. Other "trim" is cut from primal beef portions during the slicing and disassembly process of carcasses that is required during preparation of small cuts for human consumption. During these processes, a significant amount of lean beef can be cut from the carcass and carried away with the fat and/or tallow. Lean beef comprises predominantly muscle protein, although some amounts of fat and tallow are present, while fat and tallow comprise predominantly glycerides of fatty acids with connective tissue and collagen and are the predominant constituents of plant and animal fat. The lean beef content in trim may be as high as 45% to 50% by weight or higher. Presently, trim has little use except for sausage production, or alternatively the fat may be rendered.

A need therefore exists to more efficiently separate the lower value tallow with fat from the higher value lean beef contained in trim and to more effectively kill, reduce, or completely remove the microbial pathogenic population and to eliminate sources of cross contamination and recontamination, while also producing a beef product of specific fat content.

SUMMARY

In some embodiments, a method of the production of beef having a predetermined fat content comprises a first process including grinding a first beef material, freezing at least fat in the ground first beef, breaking off first fat from the ground first beef, mixing the remaining first beef and broken off fat with a first fluid, and separating the first fat to produce a first stream of beef; a second process of grinding a second beef material, mixing the ground second beef with a second fluid, and separating second fat to produce a second stream of beef; and combining the first stream of beef with the second stream of beef and then grinding the combined beef. In some embodiments, the first beef has on average between 50 wt. % to 70 wt. % of lean beef. In some embodiments, the second beef has on average between 50 wt. % to 70 wt. % of lean beef. In some embodiments, the second process does not include freezing the ground second beef. In some embodiments, the method further comprises collecting the separated first fat and the first fluid in a fat floatation tank, and separating the first fat from the first fluid.

In some embodiments, a method for the separation of fat from beef comprises grinding beef; followed by freezing at least fat contained in the beef; followed by breaking off fat contained in the beef; followed by mixing the remaining beef and broken off fat with a fluid; followed by separating the remaining beef from the fluid through settling of the beef; collecting the broken off fat that floats in the fluid in a vessel. In some embodiments, the method further comprises emulsifying and then heating the collected fat. In some embodiments, the method further comprises separating solids after emulsifying and heating the collected fat.

In some embodiments, a method for separating lean meat from lean meat-containing material comprises reducing meat into particles; cooling the particles; after cooling, crushing the particles to break apart fat from the particles; mixing the particles and fat with a fluid spun into a vortex; transporting the mixture through a manifold and removing particles that sink from the bottom of the manifold, and transporting remaining mixture to a settling vessel; and transporting the particles that sink to a decanter centrifuge.

In some embodiments, the fluid is an aqueous fluid comprising water, a microbiocidal agent, and nanobubbles having a size of less than 100 nm. In some embodiments, the pathogen deactivating microbiocidal agent is dissolved in the water, and is not contained in the nanobubbles.

In some embodiments, the microbiocidal agents include one or more of hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide.

In some embodiments, the method further comprises, in the settling vessel, individually separating fluid, fat and connective tissue.

In some embodiments, the method further comprises rendering the fat into a liquid by heating, and centrifugally spinning the liquid to individually separate liquid beef tallow, water, and beef solids.

In some embodiments, the method further comprises combining the particles that sink with fluid and then centrifugally spinning the fluid and particles in decanter centrifuge to separate lean from the fluid.

In some embodiments, the method further comprises spinning an inner scroll of the centrifuge at a higher rpm than an outer bowl of a centrifuge, and expelling lean beef particles at one end of the centrifuge, while expelling fluid and suspended or floating matter at an opposite end of the centrifuge.

In some embodiments, the scroll has left hand and right hand flights.

In some embodiments, in the vortex mixing step, the ratio of fluid to solids, including particles and fat, is at least 8 parts fluid to 1 part solids by weight or volume.

In some embodiments, the decanter centrifuge separates lean from the fluid and a separation time from mixing the fluid in a vortex vessel to separating the fluid from the lean in the decanter centrifuge is less than 3 minutes, or less than 90 seconds.

In some embodiments, the step of mixing the particles and fat with a fluid spun into a vortex further comprises measuring a weight to control a depth of the fluid/solids suspension.

In some embodiments, a method for separating lean meat from lean meat-containing material comprises providing lean meat-containing material having lean meat and fat; before reducing the lean meat-containing material into particles, chilling the lean meat-containing material while avoiding completely freezing the lean meat; while the fat is rigidly frozen and is friable but lean meat is not frozen rigidly and remains flexible; reducing the lean meat-containing material into particles, wherein the particles include particles that have a majority of lean meat and particles that have a majority of fat; combining the particles with a fluid, wherein the fluid with or without nanobubbles includes water and one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide; introducing the particles and the fluid into a centrifuge after separating a majority of the fat particles; in the centrifuge, separating a first stream comprising the particles that have a majority of lean meat and a second stream comprising the fluid with a quantity of fat particles; separating the fat particles from the fluid and sanitizing the fluid and recycling the sanitized fluid; and treating the first stream comprising the particles that have a majority of lean meat to reduce pathogens via a method that does not result in raising the temperature above 109.degree. F.

In some embodiments, a method for separating lean meat from lean meat-containing material comprises providing lean meat-containing material having lean meat and fat; before reducing the lean meat-containing material into particles, chilling the lean meat-containing material while avoiding freezing the lean meat while the lean meat is non-frozen; reducing the lean meat-containing material into particles, wherein the particles include particles that have a majority of lean meat and particles that have a majority of fat; combining the particles with a first fluid, wherein the first fluid includes water and gas nanobubbles; introducing the particles and the first fluid into a centrifuge after separating a majority of the fat particles; in the centrifuge, separating a first stream comprising the particles that have a majority of lean meat and a second stream comprising some fat particles and the first fluid; reducing the organic matter content of the first fluid and recycling the first fluid with reduced organic matter content; and treating with a second fluid containing nanobubbles, the first stream comprising the particles that have a majority of lean meat to reduce pathogens via a method that does not result in raising the temperature above 44-degree. F.

In some embodiments, a method for separating meat components comprises combining fat solids and lean meat solids with a fluid comprising water and removing the majority of fat particles; after separating the majority of the fat solids centrifugally spinning the fluid by centrifuge; individually separating the lean meat solids and the fluid with some fat particles, wherein the lean meat solids, and the fluid with some fat solids are separated in the same centrifuge; controlling the temperature of the lean meat solids before separating; and controlling the temperature of separated fluid, and dividing the fat particles into a first stream of beef tallow and a second stream comprising substantially protein.

In some embodiments, a method for separating fat particles from lean particles comprises providing diced beef pieces, wherein the diced beef pieces comprise fat and lean; lowering the temperature of the diced beef pieces to a first reduced temperature for the fat at which the fat is friable while simultaneously achieving a second reduced temperature for the lean at which the lean is not frozen solid and is flexible; crushing the beef pieces to liberate the fat without fracturing lean and creating fat particles and lean particles; combining the fat particles and the lean particles with a fluid containing gas nanobubbles to provide a mixture; introducing the mixture to an inlet of a chamber, wherein the chamber has an upper outlet and a lower outlet; allowing particles less dense than the fluid to be carried out from the chamber through the upper outlet with fluid; allowing the particles more dense than the fluid to be carried out from the chamber through the lower outlet with fluid; transferring the fluid with particles from the upper outlet to a separator wherein the particles are separated from the fluid and transferring the fluid with particles from the lower outlet to a centrifuge wherein the particles are separated from the fluid.

In some embodiments, a method for separating fat from beef comprises combining beef provided as small pieces with a fluid with or without nanobubbles comprising one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, in a separation manifold and creating turbulence in the manifold with the small beef pieces and the fluid allowing beef components comprising predominantly fat to rise to the top of the fluid in the manifold and beef components comprising predominantly lean beef to settle to the bottom of the fluid in the manifold; removing the beef components comprising predominantly fat from the fluid; and transferring the beef components comprising predominantly lean beef with fluid to a centrifuge.

In some embodiments, a method of reducing the fat content of a material comprises combining a material comprising a separable fat component with a fluid comprising one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, with or without nanobubbles, wherein the density of the fluid is greater than the density of the fat component of the material; allowing the fat component from the material to separate from the material and to stratify forming a first stratum in the fluid, thereby leaving a reduced fat component of the material; allowing the reduced fat component to stratify forming a second stratum in the fluid; and collecting the second stratum comprising reduced fat component.

In some embodiments, a method for separating fat from a material containing fat comprises combining a material with a fluid, with or without nanobubbles, comprising one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, wherein the material comprises components that comprise predominantly fat and components that comprise predominantly lean beef; transferring the material and fluid through a conduit, wherein the conduit comprises more than one outlet located along the length and at a lower section of the conduit; allowing the components that comprise predominantly fat to rise in the fluid as the fluid and material are transferred through the conduit; and removing the components that comprise predominantly lean beef that settle to the bottom of the conduit from at least one outlet at the lower section of the conduit as the fluid and material are transferred through the conduit, wherein components that are removed from the more than one outlet become higher in fat and connective tissue as the fluid progresses through the conduit.

In some embodiments, a method for separating meat components comprises (a) centrifugally spinning a mixture of meat components, a fluid, with or without nanobubbles, including one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, or water with nanobubbles, within a centrifuge to separate meat components in concentric zones according to density, wherein denser components accumulate farther away from the axis of rotation and less dense components accumulate closer to the axis of rotation; and (b) transferring denser components towards a first cone-shaped section of the centrifuge via a first screw action and transferring less dense components towards a second cone-shaped section of the centrifuge via a second screw action, wherein gas can accumulate at zones in the proximity of the cone-shaped sections so as to impede the fluid from exiting with the meat components.

In some embodiments, a method for separating fat comprises (a) combining particles comprising fat and lean meat or both fat and lean meat with a fluid; (b) introducing the particles and the fluid into an enclosed separator having one or more inclined or vertical surfaces; (c) separating particles at different elevations of the separator, wherein the particles having a density greater than the fluid will collect at a lower elevation, and the particles that have a density less than the fluid will collect at a relatively higher elevation; and (d) reducing the size of the particles that have a density less than the fluid, and separating lean meat from solid material via a centrifuge.

In some embodiments, a separator manifold comprises (a) a first enclosed conduit disposed at an incline or perpendicular to the manifold; and (b) a second enclosed conduit disposed at an incline or perpendicular to the manifold wherein a lower side of the manifold is joined via a port to an end of the second conduit to allow protein material that settles to the lower side of the manifold to be transferred into the second conduit.

In some embodiments, a method for producing treated meat having a predetermined proportion of water comprises calculating changes of water content in meat during processing of the meat; placing meat in a vessel; introducing at an elevated pressure, a fluid, with or without nanobubbles, comprising an amount of water containing one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, or having a pH below 5 into the vessel and in contact with—the surfaces of the meat; providing turbulence in the vessel to expose surfaces of meat to the fluid: wherein said amount of water is a calculated amount of water that is lost during processing to result in a predetermined proportion of water in the meat; and packaging the meat containing a predetermined proportion of water in a container.

In some embodiments, a method for producing treated meat having a predetermined proportion of water in a container comprises determining a proportion of water suitable for a packaged meat; placing meat in a vessel; introducing a bactericide and added water into the vessel, wherein the added water exceeds the predetermined proportion of water suitable for packaged meat; calculating an amount of water that is to be removed in a centrifuge; transferring the meat into a centrifuge and removing water in excess of the predetermined proportion of water in meat to produce treated meat having the predetermined proportion of water suitable for packaged meat; and packaging the meat containing a predetermined amount of water.

In some embodiments, a method of processing perishable products comprises sealing a perishable product in an enclosure; calculating an amount of water to be removed from the perishable product; and transferring the perishable products with an amount of water into a centrifuge to remove said amount of water calculated to be the amount of water that is to be removed to result in a predetermined amount of water in the product when the product is packaged.

In some embodiments, a method for separating beef comprises reducing beef into small beef components; combining the beef components with a fluid in a vessel, wherein the fluid is a blend of carbon dioxide and water or chlorine or chlorine compound and water, wherein the pH of the fluid is reduced; mixing the beef and fluid in the vessel; allowing beef components comprising predominantly fat to rise to the top of the fluid and beef components comprising predominantly lean beef to settle to the bottom of the fluid; removing the beef components comprising predominantly fat from the fluid; and removing the beef components comprising predominantly lean beef from the fluid.

In some embodiments, a method for separating fat from a material comprises reducing a material to smaller material pieces, wherein the material pieces include components comprising predominantly fat and components comprising predominantly lean beef; adjusting the temperature of the material pieces to a range from about 24.degree. F. (−4.4.degree. C.) to about 110.degree. F. (43.3.degree. C.); combining the material pieces with a fluid in a vessel, wherein the density of the fluid is greater than or equal to the density of the components comprising predominantly fat and less than or equal to the density of the components comprising predominantly lean beef, wherein the fluid, with or without nanobubbles, includes one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, wherein the pH of the fluid is reduced; allowing the components comprising predominantly fat to rise in the fluid forming a first stratum in the fluid; allowing the components comprising predominantly lean beef to settle in the fluid forming a second stratum in the fluid; and collecting the second stratum comprising components comprising predominantly lean beef.

In any of the methods, the fluid can be re-used. In an embodiment, after the fluid is separated and before re-use, the fluid is heated, followed by centrifuging, followed by refrigerating, followed by introducing carbon dioxide and chlorine.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
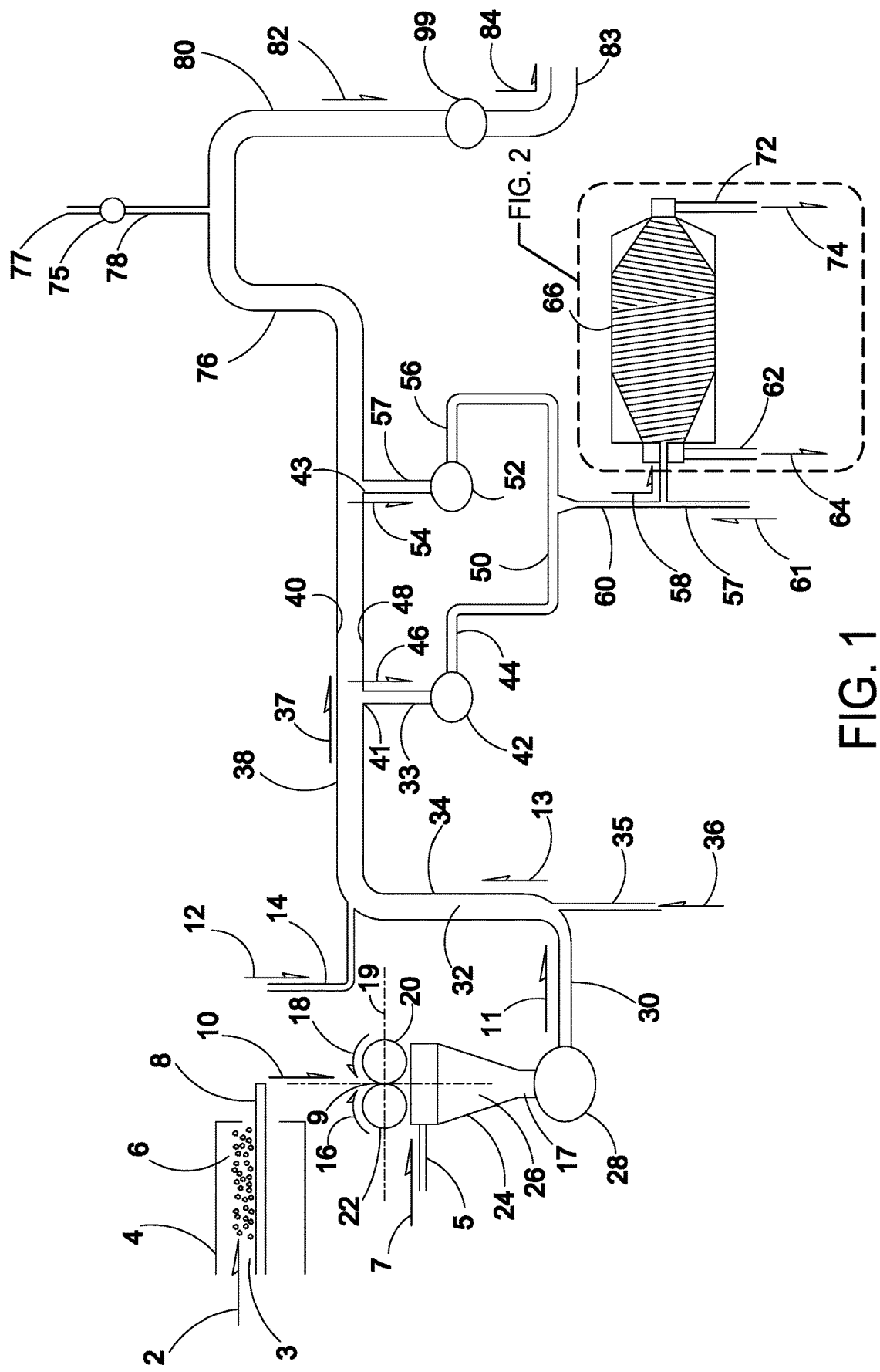
FIG. 1 is a diagrammatical illustration of a chilled beef rapid separation system.

Referring now to FIG. 1 a diagrammatic representation in a cross sectional format is shown of a system known as a Chilled Beef Rapid Separation System (CBRSS) which is arranged to enable the separation of beef components comprising lean beef, connective tissue and beef fat.

A cryogenic freezing tunnel 4 is arranged to reduce the temperature of a continuous stream of size-reduced beef particles 3 having a size of not more than about 1 inch across. The particles 3 contain both lean beef and beef fat in varying proportions. The particles 3 are cut from larger pieces of beef, such as primals, or can be the leftovers or trimmings after the harvesting the primal cuts of beef. The particles 3 are transferred in the direction shown by arrow 2 through space 6 on a conveyor 8 having a controlled speed. Preferably, liquid nitrogen can be provided within space 6 so as to make direct contact with the beef particles 3 in such a manner so as to consistently reduce the temperature of the beef particles 3 to a controlled value.

The speed of conveyor 8 and the quantity of liquid nitrogen provided into space 6 is controlled such that the finished temperature of the beef particles is as follows. After transfer through the temperature-reducing cryogenic tunnel 4, the temperature of lean beef is about 10° F. to 26° F. and is significantly higher than the temperature of the beef fat which is about −5° F. to 2° F. In this way, the beef fat will crumble while the lean remains flexible when subjected to a crushing force. In some embodiments of the cooling step, freezing of the lean completely is avoided, and the fat is preferentially, rigidly frozen and is friable, but lean meat is not frozen rigidly and remains flexible. In some embodiments of the cooling step, the lean meat-containing material is chilled while avoiding freezing the core or center of the lean meat component; while the surface of the lean meat is non-frozen. In some embodiments of the cooling step, the temperature of the diced beef pieces is lowered to a first reduced temperature for the fat at which the fat is friable while simultaneously achieving a second reduced temperature for the lean at which the lean is not frozen solid thereby remaining partly flexible.

The stream of beef particles 3 drops in the form of a "waterfall" in the direction shown by arrow 10 vertically downward and directly into a gap 9 arranged between two steel rollers 22 and 20. Steel cylindrical rollers 22 and 20 are arranged parallel and at the same level having a common centerline 19 and rotating in opposing directions shown by arrows 16 and 18. Roller 20 rotates counterclockwise in the figure, and roller 22 rotates clockwise in the figure. The surface speed of the rollers 22 and 20 is greater than the velocity of the particles which are gathering speed as they fall downward and into the gap 9 between the rollers 22 and 20. The gap can be between about ⅓₂" to ⅓" wide, but most preferably ¹⁄₁₆" wide.

In some embodiments, the crumbling of the beef pieces will result in particles that comprise predominantly fat, and the leftover pieces from which the fat has been broken off comprise predominantly lean. In some embodiments, the rollers crush the beef pieces to liberate the fat without fracturing the lean thereby creating fat particles and lean particles.

Significant heat is instantly generated within and at the core of the beef particles by friction resulting from the crushing force applied to the beef particles by the steel rollers 22 and 20 such that the average temperature of the processed beef particles is significantly higher than it is prior to crushing. The average beef particle temperature may be in the order of 20° F. after passing between rollers 22 and 20, or in the range of 10° F. to 30° F., or 15° F. to 25° F.

Directly below the pair of steel rollers 22 and 20 is a cone shaped vessel 24 arranged with a large open top close to the underside of the rollers 22 and 20. The purpose of the vessel 24 is to combine the fat and lean particles with a fluid. In some embodiments, the density of the fluid is greater than the density of a majority of the fat particles and lower than the density of a majority of the lean particles. In this manner, the mostly fat particles will rise or float in the fluid and the mostly lean particles will sink or settle in the fluid. The density of the fluid can be controlled by temperature, by combining with other agents, such as carbon dioxide, or by microbiocidal agents. In some embodiments, the fluid can include water with one or more microbiocidal agents. In some embodiments, the microbiocidal agents can include one or more of hypochlorous acid, hydrochloric acid, paracetic acid, sulphuric acid bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide. In some embodiments, any of the foregoing microbiocidal compounds can optionally be combined with water. The cone shaped vessel has inclined walls which taper down to a smaller diameter tube section 17. This configuration thereby provides a "vortex" vessel 24, into which a stream of fluid is transferred via pipe 5 in the direction shown by arrow 7. A space 26 is therefore defined and provided by the walls of the "vortex" vessel 24 such that size reduced beef particles are directed into the open "vortex"/vessel top above space 26 and into space 26.

The pipe 5 is arranged tangentially relative to the circular wall of vessel 24 terminating at an opening which enters space 26 and therefore forming a volute through which pressurized fluid is transferred. The stream of fluid entering space 26 is provided therein at such a mass flow and velocity so as to cause the stream to follow close to the inner vortex walls, spinning there around and gradually descending toward the pipe section 17 at the lower end of the vortex 24. The fluid stream descends, gradually gathering speed as the vortex narrows toward pipe section 17. In this way, the stream of fat and lean particles is directed into the vortex thereby rapidly mixing with the fluid.

The fluid transferred into the vortex space 26 via pipe 5 in the direction shown by arrow 7 comprises either water or an aqueous alkaline solution or an aqueous acidic solution but most preferably will have been treated to contain nanobubbles of air, oxygen, chlorine, chlorine dioxide or carbon dioxide and having a paramagnetic quality and a particle size of between 50 nm to 100 nm. In this size range, nanobubbles will not immediately rise to the surface, but, instead will drift in the fluid for extended periods of time. Fluids with nanobubbles and agents have greater pathogen deactivation qualities, and when optimally applied can reduce any pathogens attached to the beef particles to undetectable populations. The effect of "nanobubbles" made with a paramagnetic gas, such as $O_2$, is to reduce surface tension which in turn substantially improves the efficacy of the sanitation materials dissolved in the water (e.g. $ClO_2$—which is paramagnetic but decomposes easily, which itself is 10 times more soluble than $Cl_2$). Thus, with only the normal quantities of chlorine as is typically dissolved in tap/drinking water, when the water is a nanobubble (air) suspension. Other agents may be used, such as hypochlorous acid, carbonic acid or any other suitable microbiocidal agent as either listed in this disclosure or elsewhere. A nanobubble solution of carbonic acid at a pH of 4 may be effective so as to avoid the need for high pressure and lower pH. The paramagnetic effect of the atmospheric oxygen in nanobubbles (made with air) is believed to be responsible for reducing surface tension of the water in which the nanobubbles of air are suspended. In the case of ozone ($O_3$), because $O_3$ is a diamagnetic and not a paramagnetic gas, there would appear to be no benefit using ozone in the nanobubbles but if dissolved in the water, the efficacy of ozone should be significantly improved. Thus, the level of dissolved ozone could be reduced to a low level as to avoid the issue of rancidity while having adequate pathogen deactivation effect. Also, water with suspended nanobubbles made from air may destroy biofilm and inhibit or prevent biofilm formation, for example by pathogens. Nanobubbles can be made in a number of ways. Nanobubbles can be made utilizing pressurized dissolution, electrolysis or by mixing fluids in a chamber and then passing the fluid through a shear device, such as an injector, venture, with air or another gas.

The mass flow of beef comprising the stream of beef particles can be transferred at any suitable flow rate but preferably at a rate of about 16,000 lbs per hour and the volume of fluid may be transferred via volute/pipe 5 would correspondingly be in the order of 300 to 400 gallons per minute (gpm). The ratio of beef solids, including fat and lean, to fluid is therefore on the order of 1 lb of beef particles to about 8 lbs to 12 lbs of fluid or more. It has been demonstrated that if insufficient fluid is provided, separation cannot be readily achieved and a ratio of at least 1:8 beef versus fluid can provide efficient separation. In some embodiments, in addition to adding turbulence in the vessel to expose surfaces of meat to the microbiocidal fluid, the amount of fluid is also calculated to supply an amount of water that is lost during processing to result in a predetermined proportion of water in the meat. As water can be lost during the cooling step, the addition of the fluid can replenish the water that is lost through evaporation. This will allow packaging the meat containing a predetermined proportion of water in a container. In other embodiments, the amount of water that is to be removed in a centrifuge can be calculated and controlled.

The temperature of the fluid is preferably above 34° F. and even greater than 40° F. while the average temperature of the beef particles can be below 32° F. and when combined such that the resultant average temperature of the combined beef particles and fluid is on the order of 37° F. to 40° F.

In order to prevent the vortex 24 from overflowing due to an accumulation of too much fluid and beef particles or alternatively allow air to be transferred into pipe 30 due to an inadequate accumulation of fluid and beef solids in the vortex 24 the following arrangement can be provided. The sine pump 28 assembly, including the sine pump drive motor and any integrated gearbox with the vortex 24 (complete sine pump assembly) and pipe connection 17 may be most preferably mounted on load-cells with flexible connections between the pump 28 to pipe 30 and inlet pipe 5 to the vortex 24. The complete sine pump assembly is mounted on load cells in such a way to enable and make available a value representing the weight or mass of the complete pump assembly including the accumulated fluid with solids in the complete assembly at any time during operation, continuously. In this way the weight value can be used to control the sine pump 28 speed. For example, if the accumulation of fluid and beef solids (the vortex 24 accumulated level) is tending to overfill the vortex 24, the speed and corresponding sine pump mass flow can be correspondingly elevated such that the level of accumulated fluid and solids vortex 24 will be lowered a controlled amount. Alternatively, if the transfer of fluids and solids into the vortex 24 is inadequate such that the accumulated level drops, the sine pump 28 speed can be reduced so as to allow a greater accumulation of fluids and solids in the vortex 24. Accordingly, the overfilling or under-filling of the vortex can be monitored continuously so as to prevent overflow or the transfer of air/gas into pipe 30.

A large Sine Pump 28 is located directly below pipe section 17 and connected thereto so that the mixture or suspension of beef particles and fluid can be pumped at elevated pressure directly into enclosed pipe section 30 in the direction shown by arrow 11. The mass flow of beef particles and fluid transferred via pump 28 must not be excessive. The supply of beef solids and fluid (suspension) transferred into pipe section 17 must not be less than the amount pumped therefrom via sine pump 28 so as to avoid the transfer of any gas or air (other than the air of gas contained in a nanobubble condition as described above) with the fluid suspension into pipe section 30.

The suspension is then transferred into vertical pipe section 34 via space 32 in the direction shown by arrow 13. Additional temperature controlled fluid which preferably contains nanobubbles of air, chlorine or a chlorine compound (such as chlorine or chlorine dioxide) or carbon dioxide can be transferred via pipe section 35 in the direction shown by arrow 36 and/or fluid of any temperature controlled selection can be transferred via pipe 14 in the direction shown by arrow 12. The mixture of beef solids and selected fluid are then transferred with any optionally added fluids into horizontal separation manifold section 38.

In some embodiments, the manifold 38 or separator is used in separating particles at different elevations, wherein the particles having a density greater than the fluid will collect at a lower elevation, and the particles that have a density less than the fluid will collect at a relatively higher elevation. In some embodiments, the suspended beef solids and fluid will stratify according to their density while flowing along the horizontal manifold 38 wherein the smaller beef fat particles flow in the direction shown by arrow 37 and in close proximity to the upper, inner surface 40 of the manifold 38 while the larger lean particles sink and flow in the direction shown by arrow 37 along the lower, inner surface 48 of conduit 38. Other particles which may be relatively very few when expressed as a proportion of the solids in the fluid and that comprise a combination of partly beef fat and/or lean and/or connective tissue may remain suspended in the liquid and flowing in the direction of arrow 37 along the central region of the manifold 38 between the upper and lower inner surfaces of the manifold 38.

A first lower port 41 or outlet is located at the conjunction of the underside of manifold 38 and pipe 33 is conveniently located to facilitate the extraction of lean beef particles with a minimized quantity of fluid via pipe 33. A pump 42, which is most preferably a sine pump, is connected directly to the lower end of pipe 33 so as to enable the mass flow controlled extraction of fluid with suspended lean beef particles through pipe 33 in the direction shown by 46 and to then transfer the mixture into pipe sections 44 and 50 and into decanter centrifuge 66 which is described more fully in connection with FIG. 2. A second lower port 43 or outlet located at the conjunction of manifold 38 and pipe section 57 is arranged to facilitate extraction of limited fluid and lean beef particles in the direction shown by arrow 54 by way of mass flow controlling pump 52 which most preferably is a sine pump. The fluid and solids extracted via pipe 33 and the fluid and solids extracted via pipe 57 are thereby combined, in this configuration at the confluence of pipes 50 and 56. The combined quantity of fluid and solids is then transferred in pipe 60 in the direction shown by arrow 58 into decanter centrifuge 66. Optionally, a continuous stream of any selected fluid can be added to the stream of materials transferred in the direction shown by arrow 58 by transfer through pipe 57 in the direction shown by arrow 61.

Figure 2:
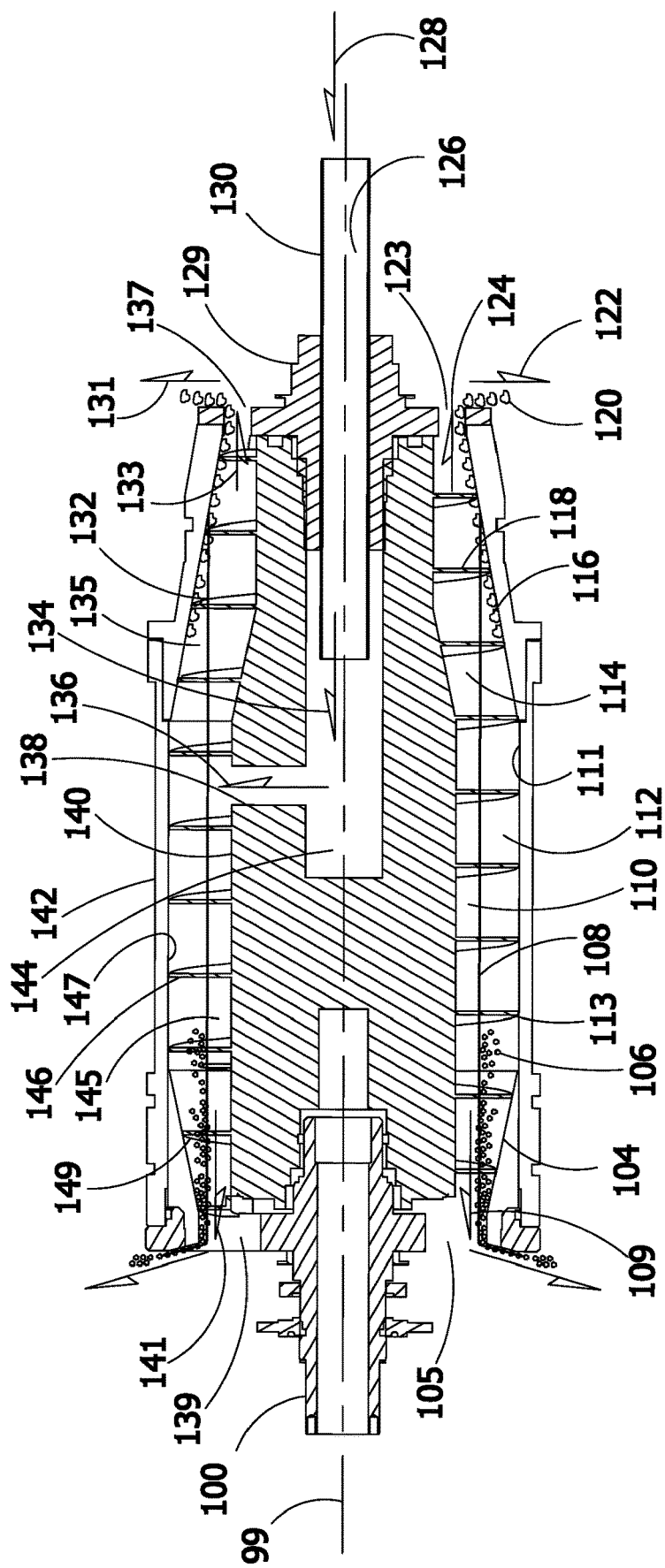
FIG. 2 is a diagrammatical illustration of centrifuge.

The combined stream of materials transferred into centrifuge 66 via pipe 60 is then treated generally according to the treatment as described in association with FIG. 2 wherein a combined stream of fluid and some suspended solids are separated, transferred into pipe 62 in the direction shown by arrow 64 and onto further processing (not shown) or into storage vessels (not shown), whereas lean beef particles are separated from the fluid and transferred via a conduit represented by member 72 in the direction shown by arrow 74 and then onto a conveyor to further processing or packaging.

Substantially all lean beef (as in the red muscle content) is separated via the first and second lower outlet ports 41 and 43 such that beef fat particles including connective tissue and the remaining fluid is preferably transferred along the full length of manifold 38 and then upwardly via pipe section 76 and downwardly via pipe section 80 in the direction shown by arrow 82. Optionally a pump 99 is connected to the lower end of pipe 80 wherein the pump 99 is preferably a sine pump which can be used to create back pressure in the space 32 and along the full length of manifold 38 and pipes 76 and 80. A flow regulator 75 can be optionally located in a pipe 78 with an open end 77 so as to provide a means of controlling pressure in the separation manifold 38.

Most preferably the "separation time" for the separated lean beef stream 3 from the fluid is minimized. The "separation time" is the period of time between the instant of combining the beef solids 3 together with the fluid stream transferred via pipe 5 in the direction of arrow 7, together in space 26 and separation of the lean beef particles stream transferred via pipe 72 in the direction shown by arrow 74. The "separation time" period should be not more than 3 minutes but preferably less than 90 seconds, however the "separation time" period may be less than 30 minutes, or less than 20 minutes or less than 5 minutes. The minimized period of "separation time" can ensure that no beef micronutrients are separated or removed from the lean beef particles which may otherwise occur.

In an alternative embodiment, two (or more) centrifuges may be employed in place of centrifuge 66 (as described above), wherein pipe 44 is connected directly to a first decanter centrifuge and pipe 56 is connected directly to a second centrifuge. In this way, the first stream of lean beef extracted via port 41 comprises a greater proportion of red muscle lean beef with a lesser proportion of connective tissue than lean beef extracted via port 43 which comprises a lesser proportion of red muscle lean beef with a greater proportion of connective tissue.

In place of a single vortex vessel 24 as disclosed in connection with FIG. 1, multiple vortex vessels can be arranged whereby the single stream of size reduced beef particles can be divided into a series of streams wherein one stream per vortex vessel is created, with a single set of downstream separation equipment connected to each vortex vessel.

After separation of lean beef and fluid via ports 41 and 43, the remaining stream of matter flowing along manifold 38 comprises a mixture of beef fat, connective tissue and fluid. The remaining stream is then transferred from the manifold via an upper outlet 76 to a flotation tank (separator) via the open end of a conduit 83 in the direction shown by arrow 84. The flotation tank (FIG. 3) enables separation of the beef fat which is then transferred by way of a suitable pump (preferably a Moyno style progressive cavity displacement pump) through a suitable heat exchanger having sufficient capacity to elevate the temperature of the beef fat stream to a pasteurizing temperature preferably at above 170° F. or alternatively to a selected temperature of less than 108° F. and then via a very high "G" force decanter centrifuge (10,000 G) wherein beef tallow and any free or bound water is separated from the solids to provide three streams comprising a first stream of liquid beef tallow, a second stream of water and a third stream of connective tissue.

The "bound" as well as any "free" water that may have been present is separated from the stream of heated beef fat then combined with the fluid water separated from the beef fat particles and connective tissue in the fat flotation tank. The combined stream of fluid is then transferred via a second high "G" force centrifuge wherein creatine, blood components and other health supplement raw materials are separated from the fluid stream and then dewatered.

Figure 3:
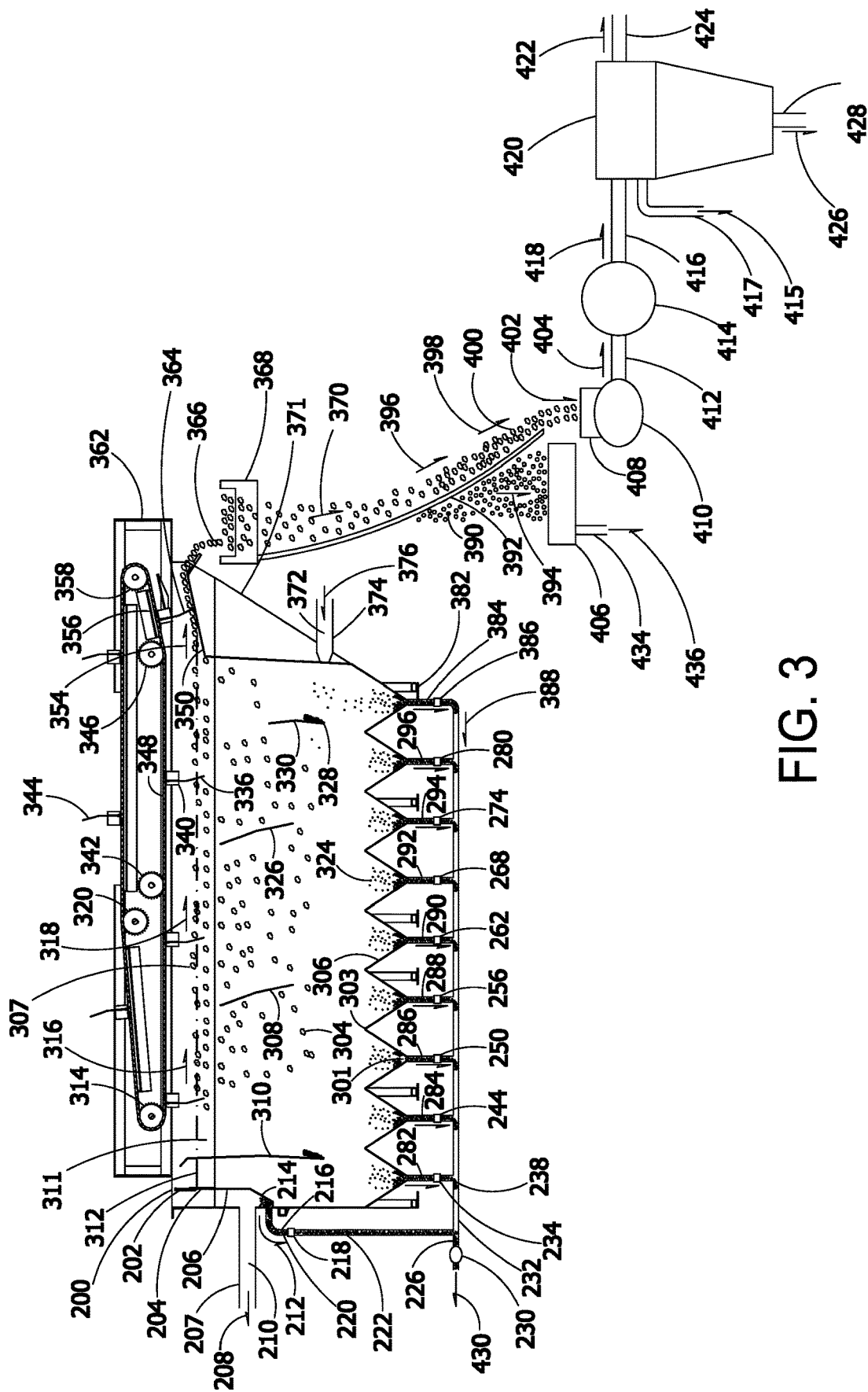
FIG. 3 is a diagrammatical illustration of settling vessel.

Referring now to FIG. 3 a cross section through an open topped flotation vessel 200 (also referred to as a separator) is shown and interfaced with other items of equipment all controlled by PLC to operate in sequence according to a specially written program and capable of separating a single input material stream of suspended solid beef fat particles 304 and 366 and particles of lean beef and connective tissue 324, suspended in the fluid 311, into several streams including a first stream of fluid, a second stream of beef fat 366 including some connective tissue and a third stream of lean beef and beef connective tissue 324. In some embodiments, the floatation vessel 200 allows for combining the material comprising a separable fat component with a fluid comprising aqueous carbonic acid, liquid carbon dioxide and water, an aqueous alkaline solution with nanobubbles, or an aqueous acid with nanobubbles, or any other microbiocidal agent listed herein with nanobubbles, such that the density of the fluid is greater than the density of the fat component of the material, allowing the fat component from the material to separate from the material and to stratify forming a first stratum in the fluid, thereby leaving a reduced fat component of the material, and allowing the reduced fat component to stratify forming a second stratum in the fluid; and collecting the second stratum comprising reduced fat component.

The open topped vessel 200, comprises an enclosure having a rectangular plan view profile with three flat vertical sides and one flat side 371 disposed at outwardly angled, all as shown in FIG. 3, with lateral, rigid baffles such as 310, 308, 330 and 326 fixed across vessel 200 and between two opposing vertical vessel sidewalls. The bottom of vessel 200 is enclosed with a base having a corrugated profile and comprising a series of peaks and troughs such as peak 303 and troughs such as 301 wherein each peak 303 and trough 301 is connected by two flat sides such as 306 with each side being disposed at suitable angle as shown (at about 60°) thereby creating "V" shaped corrugations across the bottom section of the vessel 200. All of the corrugated peaks have a common height and are level at the same altitude with lower troughs such as 301 which are arranged with bases at a similar level across the base of the vessel 200. In this way, each trough collects an accumulated quantity of dense beef particle sediment 324 as the particles are allowed to settle after transfer into vessel 200 via pipe 374. The vessel 200 with profiled bottom can be filled with the fluid suspension 311 to a level shown by broken line 312. Fluid 311 with beef particles such as 324, 307 and 304 substantially fills the open topped vessel 200 to level 312 in such a manner that light phase beef fat particles 307 are able to float at the fluid 311 surface level 312. The vessel 200 is supported on legs such as 382 arranged to carry the weight of the vessel 200 when filled with fluid 311.

The upper level 312 is adjustable by adjusting the height of baffle plate 202 which is fixed in position after any adjustment to provide a suitable fluid level 312.

The fluid suspension 311 with beef particles 307, 304 and 324 is transferred by pumping in a continuous stream from the end of pipe section 83 shown in FIG. 1 directly into space 372 of inlet pipe 374 in the direction shown by arrow 376. The fluid rate of mass flow can be any convenient rate of flow but most suitable would be in the range of 200 gpm to 400 gpm or more. The velocity of the fluid suspension transferred into vessel 200 via pipe 374 slows substantially after it has entered the vessel which is aided by lateral baffles 330, 326 and 308. This facilitates beef particle stratification such that the less dense fat particles shown as 307 steadily float upward while sedimentation of the more dense beef particles such as 324 facilitates accumulation in the corrugated troughs 301 at the bottom of vessel 200.

A paddle assembly comprising a rigid frame 362 enclosing conveyor belt 348 which is held taught and captive by end rollers 314 and 358 such that conveyor belt 348 is tensioned by support rollers 320, 342, and 346. The conveyor belt 348 has a series of paddles such as 364 and 344 fixed thereto and spaced apart equally. Conveyor assembly with frame 362 is mounted horizontally above the open topped vessel 200 such that paddles 344 can travel with the conveyor belt 348 which can be driven by a variable speed electric motor (not shown) at a suitably steady rate. Paddles 344 are profiled with a suitable curve and the entire assembly is arranged so that the paddles 344 penetrate the fluid surface 312 illustrated by paddle member 336. The fluid 311 surface level 312 with beef fat particles 307 floating at surface fills the vessel 200 up to a suitable elevation such that surface level 312 intersects a ramp member 350 which extends above the fluid level 312. The conveyor belt 348 with paddles 344 can be driven in the direction shown by arrows 316, 318 and 354 such that the paddles 336 sequentially penetrate the fluid surface as each paddle travels around end roller 314 at the left hand end of vessel 200 then moving toward the ramp member 350 which is rigidly fixed at the right hand end of vessel 200. Paddles represented by 344 and 336 extend, with a vertical disposition, across the width of vessel 200 so that as the paddles 344 travel from left to right in the direction shown by arrows 316, 318 and 354, each paddle carries a quantity of floating fat particles such as 307. The quantity of beef fat particles carried by each paddle will therefore steadily increase as the paddles are driven across the fluid surface 312 in the direction shown.

The continuous conveyor belt 348 is held taught and follows a fixed path dictated by the retaining rollers 314, 358, 320, 342 and 346 and in this way the section of conveyor belt 356 held taught between rollers 346 and 358 can be maintained parallel to the ramp section 350. This configuration ensures that the lower paddle edge as shown at 336 of each paddle 344 does not collide with or contact the flat ramp section 350, however the configuration allows a close proximity of edge 336 to the flat upper surface of ramp member 350 as the paddles are driven up the ramp 350, each transferring a quantity of beef fat upward following the ramp 350 and lifting the beef fat away from the fluid 311.

It can therefore be readily understood that beef fat particles such as 366 can be separated from the fluid such as 311 in the manner described herein above. A retaining member 368 is arranged at a convenient location adjacent to the outer edge and underside of ramp 350, so as to conveniently provide a guiding effect to the continuous "waterfall style stream" of the beef fat particles 366 as the stream drops over the ramp edge downwardly and then onto sieve member 392. The gravity-fed sieve member 392 comprises a sheet of perforated stainless steel having a curved profile and is disposed at a relatively steep angle such that beef particles 366 and 400 are impeded but not held as the beef fat particle stream falls in the direction shown by arrows 370, 396, 398 and 402. This configuration facilitates a contacting of the beef particles with the perforated member 392 but does not stop movement of the particles. In this way, excess fluid 390 which may be carried with beef particles 366 up ramp 350 can be separated without allowing the beef particles to fill the perforations which could otherwise quickly block the perforations and in so doing prevent continuous separation of the excess fluid 390 which, with this arrangement, can penetrate the perforations and fall in the direction shown by arrow 394 into trough member 406. The fluid collected in trough member 406 can be transferred via pipe 434 in the direction shown by arrow 436 and either discarded or combined with fluid extracted via pipe 207 in the direction shown by arrow 208.

The stream of beef fat solids 400 is collected in a retaining member 408 and then transferred, under elevated pressure, via a Seepex "Moyno" style positive displacement ("PD") pump 410 directly into pipe 412 in the direction shown by arrow 404, through a suitable heat exchanger 414 where the temperature of the beef fat particles 400 stream is elevated to not more than 108° F. or greater than 160° F. depending upon it's intended use, and then the stream is transferred directly into centrifuge 420 via pipe 416 in the direction shown by arrow 418. The stream of temperature elevated beef fat is then divided into 3 streams comprising a first stream of liquid beef tallow which is extracted via a pipe 424 in the direction shown by arrow 422, a second stream of water via pipe 428 in the direction shown by arrow 426 and a third stream of lean beef solids comprising substantially all connective tissue via pipe 417 in the direction shown by arrow 415.

Referring again to FIG. 3, a series of vertically disposed pipes 282, 284, 286, 288, 290, 292, 294, and 296 are each connected via open ports directly to each trough of the vessel corrugated bottom and most preferably at the lowermost level of each trough. Valves 234, 244, 250, 256, 262, 268, 274, 280, and 386 respectively are arranged to open or close such that fluid with accumulated beef solids such as 324 can be extracted from each trough separately and individually such as from trough 301. Each pipe 282, 284, 286, 288, 290, 292, 294, and 296 then connects to a common manifold pipe 232 running longitudinally along the bottom of the vessel 200. The outlet pipe 207 discharges fluid from a section on the vessel provided with a trap 204 that dips below the inlet to pipe 207 to collect any particulate matter to avoid carrying over the particulate matter in the fluid leaving the vessel 200 through pipe 207. The trap 204 is made from an upright baffle 206 that extends below the lower edge of the pipe 207. The bottom section 214 of the trap 206 is emptied through pipe 220 in the direction of arrow 212. The pipe 220 has an upper section 216 connected to a lower pipe section 222 via a valve 218. The lower pipe section 222 in turn connects to the pipe section 232 and forms a combined pipe 226. A suitably sized variable speed sine pump 230 is connected directly to the end of pipe section 226 and arranged to pump fluid with accumulated solids from pipe section 232 and pipe section 220 in the direction shown by arrow 430. As can be appreciated, the pump 230 can be used to pump fluid and solids extracted from any one or more of the troughs and the trap.

The (either open or closed) valves 234, 244, 250, 256, 262, 268, 274, 280, 386 and 218 can be arranged to be normally closed and sequenced such that only one valve is open at any given time for an adjustable period preferably about 15 seconds. The valve opening sequence can be programmed into a PLC controller used to control the valve opening and closing such that during every 150 second period each valve is open while all other valves are closed. In this way the full available pumping force of pump 230 is applied to the extraction of fluid and solids such as 301 individually from each trough section of the corrugated bottom of vessel 200.

All excess fluid remaining after separation of substantially all solids have been separated and extracted via ramp 350 or any of the 10 valves is extracted via space 210 via pipe 207 in the direction shown by arrow 208 and transferred for filtering via transfer through a high "G" force centrifuge(s) and then further processed via the nanobubbles process wherein chlorine gas, chlorine dioxide or carbon dioxide is provided in nanobubble condition into the fluid prior to recycling and generally as described herein above prior to temperature reduction (or temperature elevation according the required fluid temperature) and re-cycling through any of the pipes shown as 5, 14 or 35 in FIG. 1.

Referring now to FIG. 2 a cross section through a decanter style, centrifuge sub-assembly comprising the bowl 142, scroll 140 with flights 146, 132 and 118, feed tube 130 and drive members 100 and 129 is shown. The scroll 140 comprises left hand and right hand screw flights such as 118, 132 shown at the left hand end of the scroll 140 while flights 113 and 149 of an opposite hand are located at the opposite end of the scroll 140. The flights are ribbon-shaped, such that the outer ribbon edge is in close proximity to the bowl surface 111. The ribbon is connected to the scroll 140 in a manner to create openings between the ribbon and the scroll such that material that is not at the bowl surface that is suspended in the liquid can travel between the openings through the ribbon to the opposite end of the centrifuge. During the centrifuge separation process, heaver solids 120 are at the surface of the bowl and are carried up the ramp 116, while less dense and suspended solids 106 not at the bowl surface are transferred through the openings in the ribbon and are expelled at the opposite end of the bowl 142 through opening 105, 141.

The centrifuge sub assembly is shown without a main frame, mounting fixtures, independent drives, controls and typical guarding so as to facilitate a clear view of the centrifuge separation mechanism.

Typically, when a decanter centrifuge is used to separate beef trim into its components comprising beef fat (tallow) and lean beef, the beef trim is ground and then heated to a suitable temperature of about 108° F. prior to transfer into the decanter centrifuge. In this way the beef fat or tallow is liquefied while the lean beef and connective tissue components remain in a solid condition and the liquid fat can be readily separated from the beef solids in a decanter style centrifuge. However, the present invention does not include the sequence of heating the beef trim prior to centrifuging. In fact, the beef trim is cut into particles, frozen and crushed to separate beef fat particles from lean beef and connective tissue particles. The beef particles are then combined with a selected fluid also at low temperature. Accordingly, the purpose of this particular embodiment (i.e. wherein a scroll having left hand and right hand scroll flights is incorporated in the separation mechanism) is to enable the separation of a low temperature suspension comprising a mixture including a fluid 135 and 112 such as water or an acid solution or alkaline solution with solid beef particles 120 wherein a first, predominant portion of the solid beef particles comprises beef fat, a second proportionately lesser quantity comprises lean beef particles and/or connective tissue particles and a third lesser portion of beef particles 106 comprises any combination of fat and lean or fat, lean and connective tissue or fat and connective tissue.

The centrifuge enables the separation of the suspension 112 into particles 106 and 120 which is transferred into the centrifuge assembly via static tube 130 through space 126, into two streams wherein a first stream comprises lean beef (including a proportion of connective tissue) 120 and a second stream of fluid 112 and 135 combined with particles 106 comprising any combination of fat, fat and lean or fat, lean and connective tissue or fat and connective tissue.

The quantity of the particles 106 separated with the fluid 112 and 135 may be substantially less in volume than the quantity of lean particles 120.

The equilibrated temperature of the second stream ??? of fluid after processing via equipment described herein in association with FIG. 1 including suspended particles 106 as well as the first stream of lean particles 120 is less than 44° F. and most preferably the fluid will contain nanobubbles otherwise known as paramagnetic bubbles.

The bowl 142 is mounted on suitable bearings and rigidly attached to drive member 100. Scroll 140 is also mounted on suitable bearings and rigidly attached to drive member 129. In this way the bowl assembly 142 and 100 as well as the scroll assembly 140 and 129 can spin freely and independently. A cone shaped ramp 104 is arranged at the inner, end region of the bowl at an end thereof and a cone shaped ramp 116 comprises a section of the bowl and rigidly fixed thereto at the opposite end of the bowl to ramp 104.

The density of lean beef particles 120 is about 66 lbs/cu', the density of the fluid 112 and 135 is about 62.4 lbs/cu' while the density of the suspended particles 106 is about the same as the fluid 112 and 135 or slightly more or less.

During operation of the decanter style centrifuge, the bowl 142 is preferably driven at about 2,000 rpm while the scroll 140 is preferably driven at about 2025 rpm, thereby providing a speed differential of 25 rpm such that the scroll is preferably rotating at 25 rpm greater than the bowl, however, the speed of the independently driven bowl 142 and scroll 140 can most preferably be varied as can be the differential speed between the bowl 142 and scroll 140.

The lean particle stream is transferred via ports 137 and 123. A gas such as air or carbon dioxide is provided to fill the space 110, 114 and 145 closest to the scroll 140. The gas can pass through ports 137 and 123

The centrifuge of FIG. 2 can be used for centrifugally spinning a mixture of meat components, a fluid with or without nanobubbles, and optionally, including at least a microbiocidal agent such as, one or more of the microbiocidal agents can include one or more of hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, to separate meat components in concentric zones according to density, wherein denser components accumulate farther away from the axis of rotation and less dense components accumulate closer to the axis of rotation; and then transferring denser components towards a first cone-shaped section of the centrifuge via a first screw action and transferring less dense components towards a second cone-shaped section of the centrifuge via a second screw action, wherein gas can accumulate at zones in the proximity of the cone-shaped sections so as to impede the fluid from exiting with the meat components. In other embodiments, after separating the majority of the fat solids in the manifold 38, and transferring fluid and solids removed via the lower outlets, the centrifuge of FIG. 2 can be used to centrifugally spin the fluid to individually separate the lean meat solids and the fluid with some fat particles, wherein the lean meat solids, and the fluid with some fat solids are separated in the same centrifuge.

During operation of the decanter centrifuge shown in FIG. 2, a suspension comprising fluid (as described above) with solids is transferred via static tube 130 through space 126 in the direction shown by arrows 128 and 134 and into chamber 144 which is rotating at the same speed as the scroll 140. Centrifugal force causes transfer of the suspension through passageway 138 in the direction shown by arrow 136 and into space 114, 145 and 110. The bowl 142 and scroll 140 preferably both rotate in the same direction while the scroll rotates at a speed equal to about 25 rpm greater than the speed of the bowl. In this way the fluid with beef particles rapidly occupies a space closest to the inner surface 111 and 147 of the bowl 142 thereby creating a pool 112 with a surface 108 parallel to the inner surface 147 and 111 of bowl 142.

As the fluid with suspended beef particles is continuously forced against the inner surface 111 and 147 of the bowl 142, the gravitational force being applied causes the more dense lean beef particles 120 to quickly occupy space closest to the bowl 142 inner surface 111 and 147 while the fluid occupies the space shown by 112 and surface 108, and the remaining beef particles 106 which comprise more fat occupy locations between the inner fluid surface 108 and the bowl inner surface 111 and 147, while the fluid flows in the direction shown by arrows 141 and 109. The depth of the fluid is controlled by the location of ports shown as 139 and 105 which are preferably a group of concentrically arranged round ports positioned in an annular pattern centered around the centerline 99 with the distance between the inner surface of the bowl 111 and 147 and a circular line profile (108) which tangentially contacts the closest point of each port closest to the centerline 99 equal to the fluid pool 112 depth.

Fluid therefore exits via ports 105 and 139 and is inhibited from exiting ports 123 and 137 by gas occupying space 110 and cone shaped ramp 114.

Lean beef particles 120 are carried, in the direction shown by arrows 133 and 124 up the incline provided by cone shaped ramp 116 and then in the directions shown by arrows 131 and 122 after exiting the ports 137 and 123 caused by the action of flights such as 118 and 132 of scroll 140 which preferably rotates at 25 rpm greater than bowl 142. However, both suspended and floating particles 106 are carried with the fluid 112 which flows toward apertures 105 and 139. The floating and suspended particles 106 are then carried up the ramp 104 by the action of the flights 149 and 113. In the absence of suitably profiled and handed flights 149 and 113, the particles 106 can create a porous dam which progressively builds while allowing fluid to flow, because the adhesion to the ramp 104 caused by the centrifugal force cannot be overcome by the force provided by the flow of the fluid.

Figure 4:
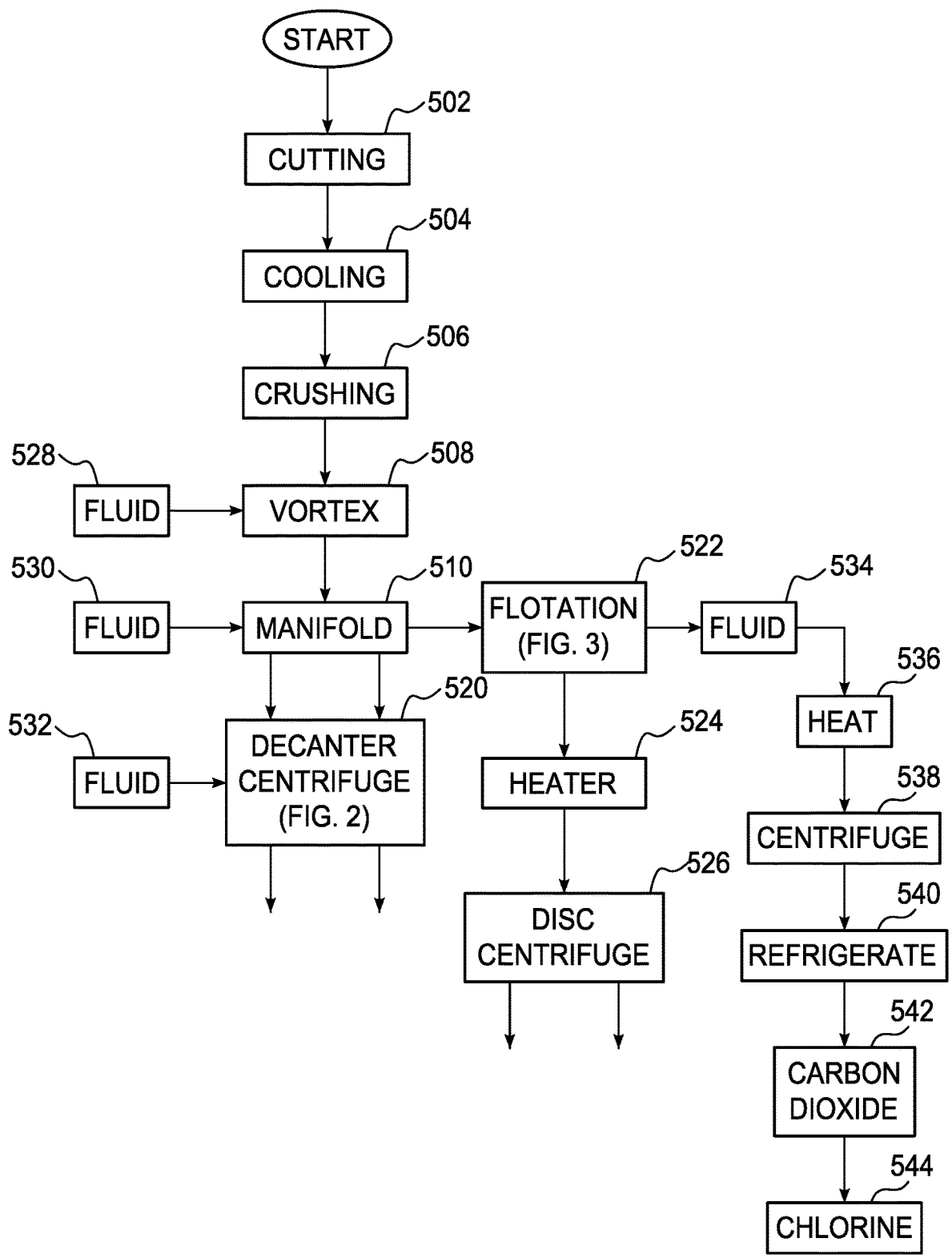
FIG. 4 is a flow diagram of a method for separating lean from fat.

FIG. 4 shows one embodiment of a method for separating lean and fat from meat, beef, or proteinaceous material.

Block 502 is a step for cutting, dicing, or otherwise reducing the size of beef, meat, or other proteinaceous material that has fat and lean. After cutting or dicing, the average size of the pieces of meat are in the order of about 1 inch across. However, there can be variation in the average size of from 0.1 inch up to 3 inches or more. From block 502, the method enters block 504.

Block 504 is a step for cooling, chilling, freezing, or otherwise reducing the temperature of the pieces of meat coming from block 502. The apparatus for cooling is described as cooling or quick freeze tunnel (item 4 in FIG. 1). Rapid cooling and different heat capacities for lean and fat result in a difference in temperatures of the fat and lean within each piece. By adjusting the exposure time to a chilling cryogenic gas or the temperature of the chilling gas or both time and temperature, it is desired that the temperature of lean be about 10° F. to 26° F. and the temperature of the fat be about −5° F. to 2° F. At these temperatures, the fat will crumble while the lean remains flexible when subjected to a crushing force. From block 504, the method enters block 506.

Block 506 is a step for crushing the cooled pieces of meat coming from the cooling tunnel. The crusher (items 20 and 21 in FIG. 1) uses two rotating rollers separated by a gap of from 1/32" to 1.00" inches but most preferably about 1/16". The cooled pieces of meat with fat and lean at the temperatures described above pass in between the rollers to be crushed, thus, liberating most or some of the fat from the lean, resulting is particles of fat that are mostly or predominantly fat and particles of lean that are mostly or predominantly lean. From block 506 the method enters block 508.

Block 508 is step for mixing the particle of fat, particle of lean, with a fluid. In one embodiment, the mixing uses a cone-shaped vessel (item 24 in FIG. 1) capable of creating a vortex with a fluid, block 428, injected tangentially to the wall to create a vortex. The fluid is the fluid described in association with element 5 in FIG. 1 and can be an aqueous fluid with a microbiocidal agent, and further include nanobubbles filled with a paramagnetic gas such as oxygen contained in air. From block 508 the method enters block 510.

Block 510 is a step for a first separation of lean particles from the fat particles and fluid. In one embodiment, the apparatus used is a manifold (item 38 in FIG. 1). The manifold is generally a pipe having a vertical section and a horizontal section, with outlets on the underside of the horizontal section. The manifold may also include one or more inlets for injecting additional fluid for temperature control and achieving a suitably selected solids to fluid ratio for good separation. The lean particles being denser than the fluid will settle and be collected by the outlets provided underneath the horizontal section of the manifold. Suspended particles and fluid continue to travel along the manifold. At this point, the solids in the manifold are mostly fat. The fluid with fat particles is transferred to a floatation tank, block 522. The flotation tank (FIG. 3) separates the fat from the fluid by allowing the fat to float to the surface of the fluid and then skimming the surface to collect the fat. In the floatation vessel, any lean that happens to collect will also be recovered. The fluid is likewise recovered, block 534, and can be processed for re-use. From block 522, the method enters block 524.

Block 524 is step for rendering the fat by the application of heat in a heater (item 414 in FIG. 3). The heat is able to render down the fat into three main constituent components, including tallow, solids, and water. After block 524, the method enters block 526.

Block 526 is a step for centrifugally spinning the materials rendered from the fat using a decanter centrifuge (item 420 in FIG. 3), for example. The decanter centrifuge is able to separate tallow and any free or bound water from the solids to provide three streams comprising a first stream of liquid beef tallow, a second stream of water and a third stream of connective tissue. Alternatively, water and solids may be separated together in a first stream with the liquidized tallow separated in a second stream.

Referring back to block 510, the lean particles that are recovered with some amount of fluid are transferred to block 520.

Block 520 is a step for centrifugally spinning the lean particles and fluid in a decanter centrifuge (FIG. 2). The decanter centrifuge is able to separate two streams of lean and fluid containing any matter that is suspended in the fluid. Fluid, block 532, may be introduced into the decanter centrifuge to achieve the required level of separation.

In FIG. 4, the fluid blocks 528, 530, and 532, can originate from the same source, or alternatively each can have a different source. The fluid of block 528, 530, and 532 can be any fluid described herein, with or without nanobubbles, and optionally including one or more microbiocidal agents such as one or more of hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide.

As can be appreciated high levels of purification of lean meat and tallow can be achieved. The lean meat and tallow can be used in a number of products. The lean meat can be combined with other meats, such as ground beef, and packaged. Additionally, control of the water content is practiced so that the packaged meats contain the appropriate amount of water or does not exceed the mandated amount of added water. An advantage of the fluid is to provide a process that is free or reduced populations of microbes or pathogens.

Figure 5:
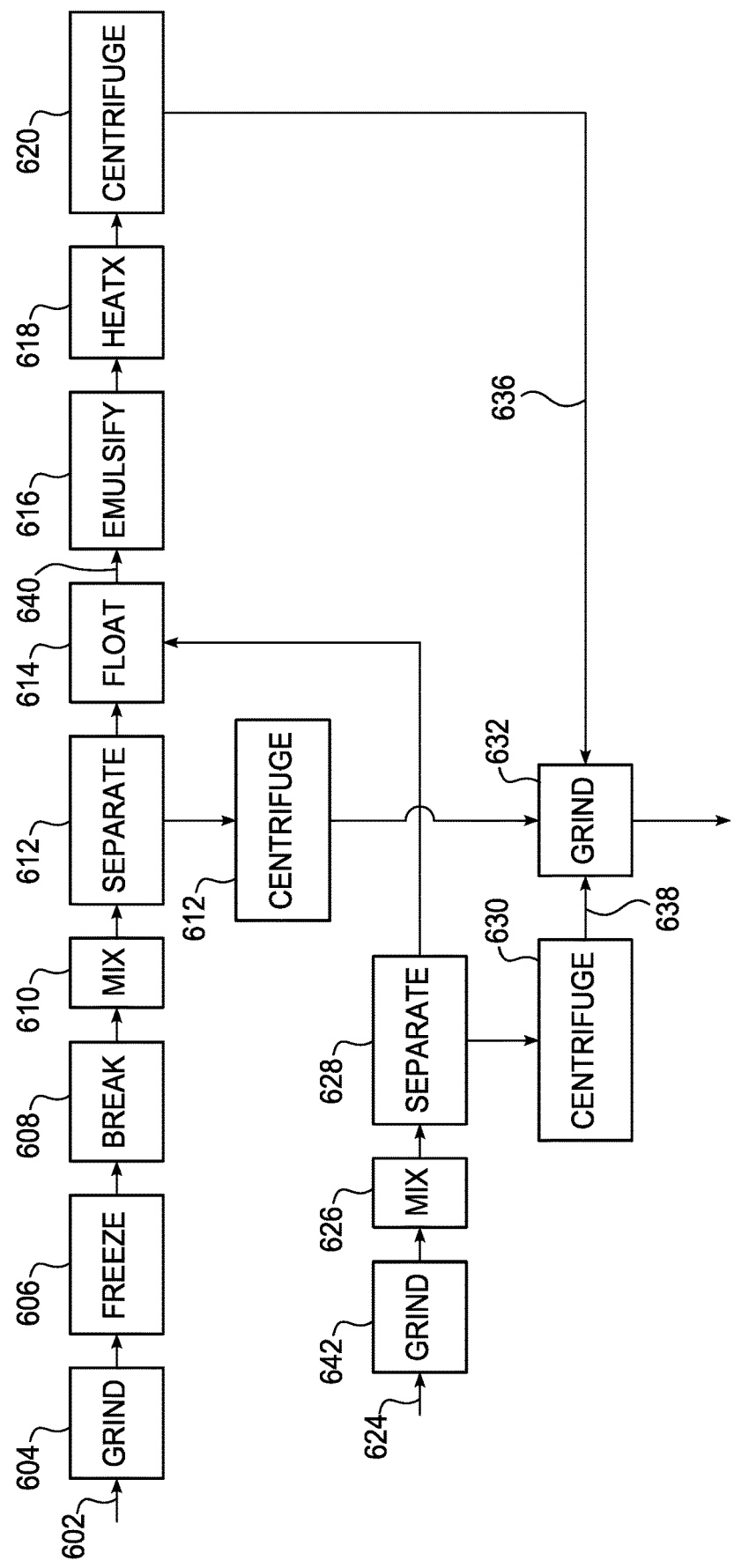
FIG. 5 is a flow diagram of a method and system for producing beef of a certain fat or lean beef content.

Referring to FIG. 5, a schematic illustration of a processing method for separation fat from lean and producing a meat product is illustrated. This embodiment is described using beef as a representative material. However, the embodiment is not thereby limited, as the embodiment is applicable to any material that contains fat and lean or proteinaceous material.

Raw materials 602 and 624 represent a supply of beef containing some amount of fat. In industry, beef and beef trimmings are grouped into broad categories by an average lean content. For example, "50's" is used to refer to beef or beef trimmings having on average about 50 wt. % lean, "60's" is used to refer to beef or beef trimmings having on average about 60 wt. % lean, and so on. Beef and beef trimmings are inconsistent and come in random sizes. In an embodiment, the raw material streams 602 and 624 include beef or beef trimmings of 10s, 20s, 30s, 40s, 50s, 60s, 70s, 80s, or 90s. In an embodiment, the raw material streams 102 and 104 include 50s. Raw material beef is supplied to block 604.

Block 604 is a grinder. A grinder is used to reduce the raw material beef into a more consistent size. From block 604, the beef material enters block 606.

Block 606 is a freezer. In an embodiment, block 606 represents a cryogenic freezing tunnel, similar to element 4 of FIG. 1. The aim of block 606 as a freezer is already described in association with FIG. 1. The temperatures achieved in block 606 are similar to the temperatures described herein for the quick freezing tunnel 4. In summary, the temperatures of the material after leaving block 606 includes, but is not limited to, a temperature of lean beef of about 10° F. to 26° F. and is significantly higher than the temperature of the beef fat which is about −5° F. to 2° F. In this way, the beef fat will crumble while the lean remains flexible when subjected to a crushing force. In some embodiments of the cooling step, freezing of the lean completely is avoided, and the fat is preferentially, rigidly frozen and is friable, but lean meat is not frozen rigidly and remains flexible. In some embodiments of the cooling step, the lean meat-containing material is chilled while avoiding freezing the core or center of the lean meat component; while the surface of the lean meat is non-frozen. In some embodiments of the cooling step, the temperature of the diced beef pieces is lowered to a first reduced temperature for the fat at which the fat is friable while simultaneously achieving a second reduced temperature for the lean at which the lean is not frozen solid thereby remaining partly flexible. From block 606, the material enters block 608

Block 608 is a "bond breaker" comprising an arrangement of at least two rollers. In an embodiment, the block 608 is similar to the elements 20 and 22 of FIG. 1. The operation of block 608 is described in association with FIG. 1, elements 20 and 22. The aim of block 608 is to break the fat from the lean, thus, creating particles that comprise mostly fat, i.e., "fat particles." The particles from which the fat is broken are thus called "lean particles" in this disclosure. From block 608, the fat and lean particles enter block 610.

Block 610 is a vortex vessel. In an embodiment, block 610 is similar to element 24 of FIG. 1. The aim of block 610 is combining the fat and lean particles with a fluid 644. The fluid and the amounts used have been described in association with FIG. 1. From block 610, the material enters block 612.

Block 612 is a separation manifold and has been described as element 38 in association with FIG. 1. The aim of block 612 is to separate the lighter fat particles from the heavier lean particles. In an embodiment, the lean particles will sink in the fluid and that fat particles will float or be suspended in the fluid. This allows the collection of the fat and the lean particles. From block 612, the fat particles enter block 614, and the lean particles enter block 622.

Block 614 is a "fat floatation tank" and is illustrated in FIG. 3. The aim of block 614 is to separate fluids from the solids that float. Those being mostly the particles higher in fat. Block 622 is a decanter centrifuge and has been described in association with FIG. 2. The aim of block 622 is to separate the fluid from the solids, the solids being the particles that are higher in lean (though some fat may still be present).

From block 614, the fat particles 640 enter block 616. Block 616 is a "micro-slicer/emulsifier." The aim of block 616 is to finely disrupt the fat particles into singular components. In an embodiment, for example, block 616 is a mechanical device that applies a shear force on the fat particles, generally by the application of a sharp rotating edge. The shear action breaks the cell walls of any fat cells to produce an emulsification of oily material and solids. From block 616, the material enters block 618.

Block 618 is a heater. In an embodiment, block 618 is a scraped surface heat exchanger. In an embodiment, the block 618 is the same as element 414 described in association with FIG. 3. From block 618, the material enters block 620. Block 620 is a disc centrifuge. In an embodiment, block 620 is the same as element 420 described in association with FIG. 3. Specifically, any solids 636 that are collected in block 620 are transferred to block 632. Additionally, referring to block 622, the lean particles that collected in the decanter centrifuge are transferred to block 632. The second raw material stream 624 can also be 50s. The raw material stream 624 enters block 642. Block 642 is a grinder. The raw material stream 624 does not need to be frozen before or after block 642. From block 642, the material enters block 626.

Block 626 is a vortex vessel that can be similar to block 610, which is similar to element 24 of FIG. 1. Block 626 is supplied with fluid 646, similar to block 610. From block 626, the material enters block 628. Block 628 is a separation manifold similar to block 612, which has been described as element 38 in association with FIG. 1. From block 628, fat particles are transferred to block 614, the fat floatation tank, and the lean particles are transferred to block 630.

Block 630 can be a decanter centrifuge, that can be similar to block 622. From block 630, the solids 638 comprising lean particles are transferred to block 632

In one embodiment, block 632 is a grinder. In an embodiment, block 632 receives lean particles 634 that comprise on average about 92 wt. % lean, block 632 receives solids 636 (lean finely textured beef) that comprise on average about 94 wt. % lean, and block 632 receives lean particles 638 that comprise on average about 75 wt. % lean. Accordingly, block 632 can produce a product from one than one stream of beef of about 85 wt. % lean.

Figure 6:
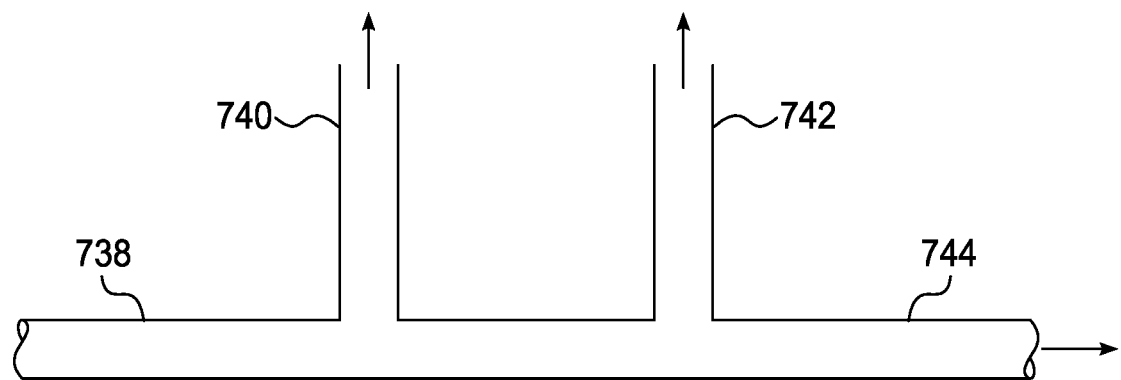
FIG. 6 is a diagrammatical illustration of a manifold separator.

Referring to FIG. 6, an alternate embodiment of a horizontal separation manifold 738 is illustrated. A horizontal separation manifold 38 is first illustrated and described in association with FIG. 1. Several other separation manifolds are described in association with FIGS. 4 and 5, including blocks 510, 612, and 628. In addition to these separation manifolds being configured as illustrated in FIG. 1, a separation manifold as described herein also includes configurations as shown in FIG. 6. FIG. 6 shows a horizontal separation manifold 738 comprising two vertically positioned take-off pipes 740, 742 from the upper side of the manifold for withdrawing fluid and the fat that floats, and the fluid with lean is carried forward in line 744. In FIG. 1, the separation manifold comprises two vertical take-off pipes 33 and 57 from the lower side of the manifold for withdrawing fluid and the lean beef that settles, and the fluid with the fat is carried forward in line 76. It should be appreciated that the manifold design of FIG. 1 is interchangeable with the manifold design of FIG. 6 and vice-versa for use in any application of a separator herein. That is, manifolds 38, 510, 612, 628, can be either manifold of FIG. 1 or FIG. 6. In addition, the separation manifolds include modifications to the manifolds of either FIG. 1 or FIG. 6. For example, a separation manifold can have both take-off pipes extending from both the upper side and the lower side of the manifold. Further, the number of take-off pipes from the upper side or the lower side or both can be one or more than one. Further, the take-off pipes of the manifold are not required to be at 90 degrees, but can have an angle of inclination, both in the direction of flow or against the direction of flow.

During the beef fat or lean separation process, as described herein, wherein fat and lean particles of beef are combined with a fluid which is then recycled (re-used), very small particles of organic matter such as fat, protein, connective tissue and components of blood become suspended and/or partially dissolved in the fluid (see block 534 in FIG. 4, for example). When these very small particles of organic matter are very small, it is possible that they can be retained in the fluid as suspended particles through the entire separation processes. Such particles of suspended organic matter when retained in the fluid can have a deleterious effect on the efficacy and/or effectiveness of antimicrobial agents, such as free chlorine, hypochlorous acid and/or nanobubbles of air, and it is therefore desirable to reduce the quantity or proportion of organic matter retained as suspended matter in the fluid prior to reuse of the fluid.

An effective method of reducing the organic matter (suspended organic matter (SOM)) content in the recycled fluid is to process the fluid (at a rate of about 100 to 120 gpm (gallons per minute) firstly by increasing the fluid temperature of the entire fluid stream to a temperature that does not exceed 108° F. (block 536, FIG. 4) and then subjecting the heated fluid to a centrifugal force by, for example, transfer through a large disc centrifuge (block 538), such as the Westfalia RSA 80-01-076 separator), that can reduce the proportion of suspended organic matter and extract and remove, a substantial proportion of the suspended organic matter. After heating the entire fluid stream and removing a substantial proportion of organic matter from the fluid, the fluid is then refrigerated (block 540) to reduce its temperature to about 38° F. and the fluid can then be treated again by injecting a small quantity of carbon dioxide gas (block 542) sufficient to reduce the pH to about 5 pH units and then adding chlorine (block 544) to the fluid such that the total free chlorine content of the recycled fluid stream is not more than about 5 PPM (5 parts per million free chlorine content).

With such treatment of the recycled fluid along with pH reduction and the addition of free chlorine as described above, to about <5 PPM chlorine, the fluid can be treated to increase nanobubble content as part of the fluid recycling process. In this way, the fluid can be effectively recycled without limitation to the number of times the fluid is reused while an approximate 3.5 log or more reduction of the viable pathogens population can be achieved with each reuse of the fluid.

Based on the foregoing disclosure, representative embodiments include, but are not limited to the following.

In some embodiments, a method of the production of beef having a predetermined fat content comprises a first process including grinding a first beef material, freezing at least fat in the ground first beef, breaking off first fat from the ground first beef, mixing the remaining first beef and broken off fat with a first fluid, and separating the first fat to produce a first stream of beef; a second process of grinding a second beef material, mixing the ground second beef with a second fluid, and separating second fat to produce a second stream of beef; and combining the first stream of beef with the second stream of beef and then grinding the combined beef.

In some embodiments, the first beef has on average between 50 wt. % to 70 wt. % of lean beef.

In some embodiments, the second beef has on average between 50 wt. % to 70 wt. % of lean beef.

In some embodiments, the second process does not include freezing the ground second beef.

In some embodiments, the method further comprises collecting the separated first fat and the first fluid in a fat floatation tank, and separating the first fat from the first fluid.

In some embodiments, a method for the separation of fat from beef comprises grinding beef; followed by freezing at least fat contained in the beef; followed by breaking off fat contained in the beef; followed by mixing the remaining beef and broken off fat with a fluid; followed by separating the remaining beef from the fluid through settling of the beef; collecting the broken off fat that floats in the fluid in a vessel.

In some embodiments, the method further comprises emulsifying and then heating the collected fat.

In some embodiments, the method further comprises separating solids after emulsifying and heating the collected fat.

In some embodiments, a method for separating lean meat from lean meat-containing material comprises reducing meat into particles; cooling the particles; after cooling, crushing the particles to break apart fat from the particles; mixing the particles and fat with a fluid spun into a vortex; transporting the mixture through a manifold and removing particles that sink from the bottom of the manifold, and transporting remaining mixture to a settling vessel; and transporting the particles that sink to a decanter centrifuge.

In some embodiments, the fluid is an aqueous fluid comprising water, a microbiocidal agent, and nanobubbles having a size of less than 100 nm. In some embodiments, the pathogen deactivating microbiocidal agent is dissolved in the water, and is not contained in the nanobubbles.

In some embodiments, the microbiocidal agents include one or more of hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide.

In some embodiments, the method further comprises, in the settling vessel, individually separating fluid, fat and connective tissue.

In some embodiments, the method further comprises rendering the fat into a liquid by heating, and centrifugally spinning the liquid to individually separate liquid beef tallow, water, and beef solids.

In some embodiments, the method further comprises combining the particles that sink with fluid and then centrifugally spinning the fluid and particles in decanter centrifuge to separate lean from the fluid.

In some embodiments, the method further comprises spinning an inner scroll of the centrifuge at a higher rpm than an outer bowl of a centrifuge, and expelling lean beef particles at one end of the centrifuge, while expelling fluid and suspended or floating matter at an opposite end of the centrifuge.

In some embodiments, the scroll has left hand and right hand flights.

In some embodiments, in the vortex mixing step, the ratio of fluid to solids, including particles and fat, is at least 8 parts fluid to 1 part solids by weight or volume.

In some embodiments, the decanter centrifuge separates lean from the fluid and a separation time from mixing the fluid in a vortex vessel to separating the fluid from the lean in the decanter centrifuge is less than 3 minutes, or less than 90 seconds.

In some embodiments, the step of mixing the particles and fat with a fluid spun into a vortex further comprises measuring a weight to control a depth of the fluid/solids suspension.

In some embodiments, a method for separating lean meat from lean meat-containing material comprises providing lean meat-containing material having lean meat and fat; before reducing the lean meat-containing material into particles, chilling the lean meat-containing material while avoiding completely freezing the lean meat; while the fat is rigidly frozen and is friable but lean meat is not frozen rigidly and remains flexible; reducing the lean meat-containing material into particles, wherein the particles include particles that have a majority of lean meat and particles that have a majority of fat; combining the particles with a fluid, wherein the fluid with or without nanobubbles includes water and one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide; introducing the particles and the fluid into a centrifuge after separating a majority of the fat particles; in the centrifuge, separating a first stream comprising the particles that have a majority of lean meat and a second stream comprising the fluid with a quantity of fat particles; separating the fat particles from the fluid and sanitizing the fluid and recycling the sanitized fluid; and treating the first stream comprising the particles that have a majority of lean meat to reduce pathogens via a method that does not result in raising the temperature above 109.degree. F.

In some embodiments, a method for separating lean meat from lean meat-containing material comprises providing lean meat-containing material having lean meat and fat; before reducing the lean meat-containing material into particles, chilling the lean meat-containing material while avoiding freezing the lean meat while the lean meat is non-frozen; reducing the lean meat-containing material into particles, wherein the particles include particles that have a majority of lean meat and particles that have a majority of fat; combining the particles with a first fluid, wherein the first fluid includes water and gas nanobubbles; introducing the particles and the first fluid into a centrifuge after separating a majority of the fat particles; in the centrifuge, separating a first stream comprising the particles that have a majority of lean meat and a second stream comprising some fat particles and the first fluid; reducing the organic matter content of the first fluid and recycling the first fluid with reduced organic matter content; and treating with a second fluid containing nanobubbles, the first stream comprising the particles that have a majority of lean meat to reduce pathogens via a method that does not result in raising the temperature above 44-degree. F.

In some embodiments, a method for separating meat components comprises combining fat solids and lean meat solids with a fluid comprising water and removing the majority of fat particles; after separating the majority of the fat solids centrifugally spinning the fluid by centrifuge; individually separating the lean meat solids and the fluid with some fat particles, wherein the lean meat solids, and the fluid with some fat solids are separated in the same centrifuge; controlling the temperature of the lean meat solids before separating; and controlling the temperature of separated fluid, and dividing the fat particles into a first stream of beef tallow and a second stream comprising substantially protein.

In some embodiments, a method for separating fat particles from lean particles comprises providing diced beef pieces, wherein the diced beef pieces comprise fat and lean; lowering the temperature of the diced beef pieces to a first reduced temperature for the fat at which the fat is friable while simultaneously achieving a second reduced temperature for the lean at which the lean is not frozen solid and is flexible; crushing the beef pieces to liberate the fat without fracturing lean and creating fat particles and lean particles; combining the fat particles and the lean particles with a fluid containing gas nanobubbles to provide a mixture; introducing the mixture to an inlet of a chamber, wherein the chamber has an upper outlet and a lower outlet; allowing particles less dense than the fluid to be carried out from the chamber through the upper outlet with fluid; allowing the particles more dense than the fluid to be carried out from the chamber through the lower outlet with fluid; transferring the fluid with particles from the upper outlet to a separator wherein the particles are separated from the fluid and transferring the fluid with particles from the lower outlet to a centrifuge wherein the particles are separated from the fluid.

In some embodiments, a method for separating fat from beef comprises combining beef provided as small pieces with a fluid with or without nanobubbles comprising one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, in a separation manifold and creating turbulence in the manifold with the small beef pieces and the fluid allowing beef components comprising predominantly fat to rise to the top of the fluid in the manifold and beef components comprising predominantly lean beef to settle to the bottom of the fluid in the manifold; removing the beef components comprising predominantly fat from the fluid; and transferring the beef components comprising predominantly lean beef with fluid to a centrifuge.

In some embodiments, a method of reducing the fat content of a material comprises combining a material comprising a separable fat component with a fluid comprising one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, with or without nanobubbles, wherein the density of the fluid is greater than the density of the fat component of the material; allowing the fat component from the material to separate from the material and to stratify forming a first stratum in the fluid, thereby leaving a reduced fat component of the material; allowing the reduced fat component to stratify forming a second stratum in the fluid; and collecting the second stratum comprising reduced fat component.

In some embodiments, a method for separating fat from a material containing fat comprises combining a material with a fluid, with or without nanobubbles, comprising one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, wherein the material comprises components that comprise predominantly fat and components that comprise predominantly lean beef; transferring the material and fluid through a conduit, wherein the conduit comprises more than one outlet located along the length and at a lower section of the conduit; allowing the components that comprise predominantly fat to rise in the fluid as the fluid and material are transferred through the conduit; and removing the components that comprise predominantly lean beef that settle to the bottom of the conduit from at least one outlet at the lower section of the conduit as the fluid and material are transferred through the conduit, wherein components that are removed from the more than one outlet become higher in fat and connective tissue as the fluid progresses through the conduit.

In some embodiments, a method for separating meat components comprises (a) centrifugally spinning a mixture of meat components, a fluid, with or without nanobubbles, including one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, or water with nanobubbles, within a centrifuge to separate meat components in concentric zones according to density, wherein denser components accumulate farther away from the axis of rotation and less dense components accumulate closer to the axis of rotation; and (b) transferring denser components towards a first cone-shaped section of the centrifuge via a first screw action and transferring less dense components towards a second cone-shaped section of the centrifuge via a second screw action, wherein gas can accumulate at zones in the proximity of the cone-shaped sections so as to impede the fluid from exiting with the meat components.

In some embodiments, a method for separating fat comprises (a) combining particles comprising fat and lean meat or both fat and lean meat with a fluid; (b) introducing the particles and the fluid into an enclosed separator having one or more inclined or vertical surfaces; (c) separating particles at different elevations of the separator, wherein the particles having a density greater than the fluid will collect at a lower elevation, and the particles that have a density less than the fluid will collect at a relatively higher elevation; and (d) reducing the size of the particles that have a density less than the fluid, and separating lean meat from solid material via a centrifuge.

In some embodiments, a separator manifold comprises (a) a first enclosed conduit disposed at an incline or perpendicular to the manifold; and (b) a second enclosed conduit disposed at an incline or perpendicular to the manifold wherein a lower side of the manifold is joined via a port to an end of the second conduit to allow protein material that settles to the lower side of the manifold to be transferred into the second conduit.

In some embodiments, a method for producing treated meat having a predetermined proportion of water comprises calculating changes of water content in meat during processing of the meat; placing meat in a vessel; introducing at an elevated pressure, a fluid, with or without nanobubbles, comprising an amount of water containing one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, or having a pH below 5 into the vessel and in contact with—the surfaces of the meat; providing turbulence in the vessel to expose surfaces of meat to the fluid: wherein said amount of water is a calculated amount of water that is lost during processing to result in a predetermined proportion of water in the meat; and packaging the meat containing a predetermined proportion of water in a container.

In some embodiments, a method for producing treated meat having a predetermined proportion of water in a container comprises determining a proportion of water suitable for a packaged meat; placing meat in a vessel; introducing a bactericide and added water into the vessel, wherein the added water exceeds the predetermined proportion of water suitable for packaged meat; calculating an amount of water that is to be removed in a centrifuge; transferring the meat into a centrifuge and removing water in excess of the predetermined proportion of water in meat to produce treated meat having the predetermined proportion of water suitable for packaged meat; and packaging the meat containing a predetermined amount of water.

In some embodiments, a method of processing perishable products comprises sealing a perishable product in an enclosure; calculating an amount of water to be removed from the perishable product; and transferring the perishable products with an amount of water into a centrifuge to remove said amount of water calculated to be the amount of water that is to be removed to result in a predetermined amount of water in the product when the product is packaged.

In some embodiments, a method for separating beef comprises reducing beef into small beef components; combining the beef components with a fluid in a vessel, wherein the fluid is a blend of carbon dioxide and water or chlorine or chlorine compound and water, wherein the pH of the fluid is reduced; mixing the beef and fluid in the vessel; allowing beef components comprising predominantly fat to rise to the top of the fluid and beef components comprising predominantly lean beef to settle to the bottom of the fluid; removing the beef components comprising predominantly fat from the fluid; and removing the beef components comprising predominantly lean beef from the fluid.

In some embodiments, a method for separating fat from a material comprises reducing a material to smaller material pieces, wherein the material pieces include components comprising predominantly fat and components comprising predominantly lean beef; adjusting the temperature of the material pieces to a range from about 24.degree. F. (−4.4.degree. C.) to about 110.degree. F. (43.3.degree. C.); combining the material pieces with a fluid in a vessel, wherein the density of the fluid is greater than or equal to the density of the components comprising predominantly fat and less than or equal to the density of the components comprising predominantly lean beef, wherein the fluid, with or without nanobubbles, includes one or more microbiocidal agents selected from hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide, wherein the pH of the fluid is reduced; allowing the components comprising predominantly fat to rise in the fluid forming a first stratum in the fluid; allowing the components comprising predominantly lean beef to settle in the fluid forming a second stratum in the fluid; and collecting the second stratum comprising components comprising predominantly lean beef.

In any of the methods, the fluid can be re-used. In an embodiment, after the fluid is separated and before re-use, the fluid is heated, followed by centrifuging, followed by refrigerating, followed by introducing carbon dioxide and chlorine.

While the preferred embodiment of the invention has been illustrated and described, it will be appreciated that various changes can be made therein without departing from the spirit and scope of the invention.

The invention claimed is:

1. A method for separating lean meat from lean meat-containing material, comprising:
   reducing meat into particles;
   cooling the particles;
   after cooling, crushing the particles to break apart fat from the particles;
   mixing the particles and fat with a fluid spun into a vortex to make a mixture of particles, fat and fluid;
   transporting the mixture through a manifold and removing fluid together with particles that sink from the bottom of the manifold, and transporting remaining mixture to a settling vessel; and
   transporting the removed fluid together with the particles that sink to a decanter centrifuge.

2. The method of claim 1, wherein the fluid is an aqueous fluid comprising water, a microbiocidal agent, and nanobubbles having a size of less than 100 nm.

3. The method of claim 2, wherein the microbiocidal agent includes one or more of hypochlorous acid, hydrochloric acid, paracetic acid, sulphuric acid, bromine, fluorine, any halogen, sulphuric acid, lactic acid, citric acid, acetic acid, ozone, carbonic acid, carbon dioxide, chlorine, chlorine dioxide, acidified sodium chlorite, a chlorine compound, a chlorine compound and water, an aqueous alkaline solution of sodium hydroxide, calcium hydroxide, ammonium hydroxide, or any other suitable alkaline solution or acid, or water with carbon dioxide.

4. The method of claim 1, further comprising, in the settling vessel individually separating fluid, fat and connective tissue.

5. The method of claim 4, further comprising, rendering the fat into a liquid by heating, and centrifugally spinning the liquid to individually separate liquid beef tallow, water, and beef solids.

6. The method of claim 1, further comprising, combining the particles that sink with fluid and then centrifugally spinning the fluid and particles in the decanter centrifuge to separate lean from the fluid.

7. The method of claim 6, further comprising spinning an inner scroll of the decanter centrifuge at a higher rpm than an outer bowl of the decanter centrifuge, and expelling lean at one end of the decanter centrifuge, while expelling fluid and suspended or floating matter at an opposite end of the decanter centrifuge.

8. The method of claim 7, wherein the scroll has left hand and right hand flights.

9. The method of claim 1, wherein the ratio of fluid to solids, including particles and fat, is at least 8 parts fluid to 1 part solids by weight or volume.

10. The method of claim 1, wherein the decanter centrifuge separates lean from the fluid and a separation time from mixing the fluid in a vortex vessel to separating the fluid from the lean in the decanter centrifuge is less than 3 minutes.

11. The method of claim 1, wherein the step of mixing the particles and fat with a fluid spun into a vortex further comprises measuring a weight to control a depth of the fluid/solids suspension.

* * * * *